(12) United States Patent
Shigeta

(10) Patent No.: US 11,703,954 B2
(45) Date of Patent: Jul. 18, 2023

(54) TOUCH INPUT DISPLAY SYSTEM

(71) Applicant: SHARP KABUSHIKI KAISHA, Sakai (JP)

(72) Inventor: Hirotaka Shigeta, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/966,693

(22) Filed: Oct. 14, 2022

(65) Prior Publication Data

US 2023/0132255 A1 Apr. 27, 2023

(30) Foreign Application Priority Data

Oct. 26, 2021 (JP) .................. 2021-174471

(51) Int. Cl.
*G06F 3/041* (2006.01)
*G06F 3/03* (2006.01)

(52) U.S. Cl.
CPC ............ *G06F 3/0304* (2013.01); *G06F 3/041* (2013.01); *G06F 2203/04106* (2013.01)

(58) Field of Classification Search
CPC ................... G06F 3/0304; G06F 3/041; G06F 2203/04106
See application file for complete search history.

(56) References Cited

U.S. PATENT DOCUMENTS

| 8,922,983 B1* | 12/2014 | Owen | G06F 1/1656 361/679.21 |
| 2009/0128508 A1* | 5/2009 | Sohn | G06F 3/0421 345/173 |
| 2011/0298752 A1* | 12/2011 | Hsieh | G06F 3/0421 345/175 |
| 2012/0050228 A1* | 3/2012 | Choi | G06F 3/0421 345/175 |
| 2012/0092301 A1* | 4/2012 | Park | G06F 3/0428 29/527.1 |
| 2012/0127141 A1* | 5/2012 | Choi | H04N 5/64 345/207 |
| 2012/0293722 A1* | 11/2012 | Kawai | G08C 23/04 398/106 |
| 2015/0103272 A1* | 4/2015 | Kokusho | G02F 1/13338 349/12 |
| 2016/0327729 A1* | 11/2016 | Patterson | G06F 3/041 |
| 2017/0277323 A1* | 9/2017 | Kim | G06F 3/0446 |
| 2020/0271846 A1* | 8/2020 | Kurihara | G02B 6/424 |
| 2020/0374010 A1* | 11/2020 | DiDonato | H04B 10/1141 |
| 2022/0011527 A1* | 1/2022 | Miyauchi | G02B 6/4245 |

FOREIGN PATENT DOCUMENTS

| JP | 2000311059 A | * 11/2000 |
| JP | 2000311059 A | 11/2000 |

* cited by examiner

*Primary Examiner* — Temesghen Ghebretinsae
*Assistant Examiner* — Sosina Abebe
(74) *Attorney, Agent, or Firm* — ScienBiziP, P.C.

(57) ABSTRACT

A touch input display system includes a display device and a touch input device. The display device includes a display, a frame enclosing the display, and a light receiver that receives infrared light emitted from an external operation device. The touch input device has a touch inputter and a frame body that encloses the touch inputter. The touch input device is attached to the display such that the frame body overlaps on a front side of the frame. The frame body has an infrared light guide. The infrared light guide guides infrared light emitted from the external operation device to the light receiver.

6 Claims, 5 Drawing Sheets

TOUCH INPUT DISPLAY SYSTEM

INCORPORATION BY REFERENCE

This application claims the priority based on Japanese Patent Application No. 2021-174471 filed on Oct. 26, 2021 under 35 U.S.C. 119, the contents of which are hereby incorporated herein.

BACKGROUND

The present disclosure relates to a touch input display system.

Some tablet input devices have a liquid crystal display mounted on a front surface thereof. Such a tablet input device includes a transparent touch panel. When the tablet input device is attached to the liquid crystal display, a user can press a predetermined position to perform a touch operation based on a screen display of the liquid crystal display.

SUMMARY

According to an aspect of the present disclosure, a touch input display system includes a display device and a touch input device. The touch input device is attached to the display device. The display device has a display, a frame, and a light receiver. The display displays images. The frame encloses the display. The light receiver is disposed on the frame to receive infrared light emitted from an external operation device. The touch input device has a touch inputter, a frame body, and an infrared light guide. The frame body encloses the touch inputter. The infrared light guide is disposed on the frame body to guide the infrared light emitted from the external operation device. The touch input device is attached to the display such that the frame body overlaps with a front side of the frame. The infrared light guide guides the infrared light emitted from the external operation device to the light receiver while the touch input device is attached to the display device.

DETAILED DESCRIPTION

Figure 1:
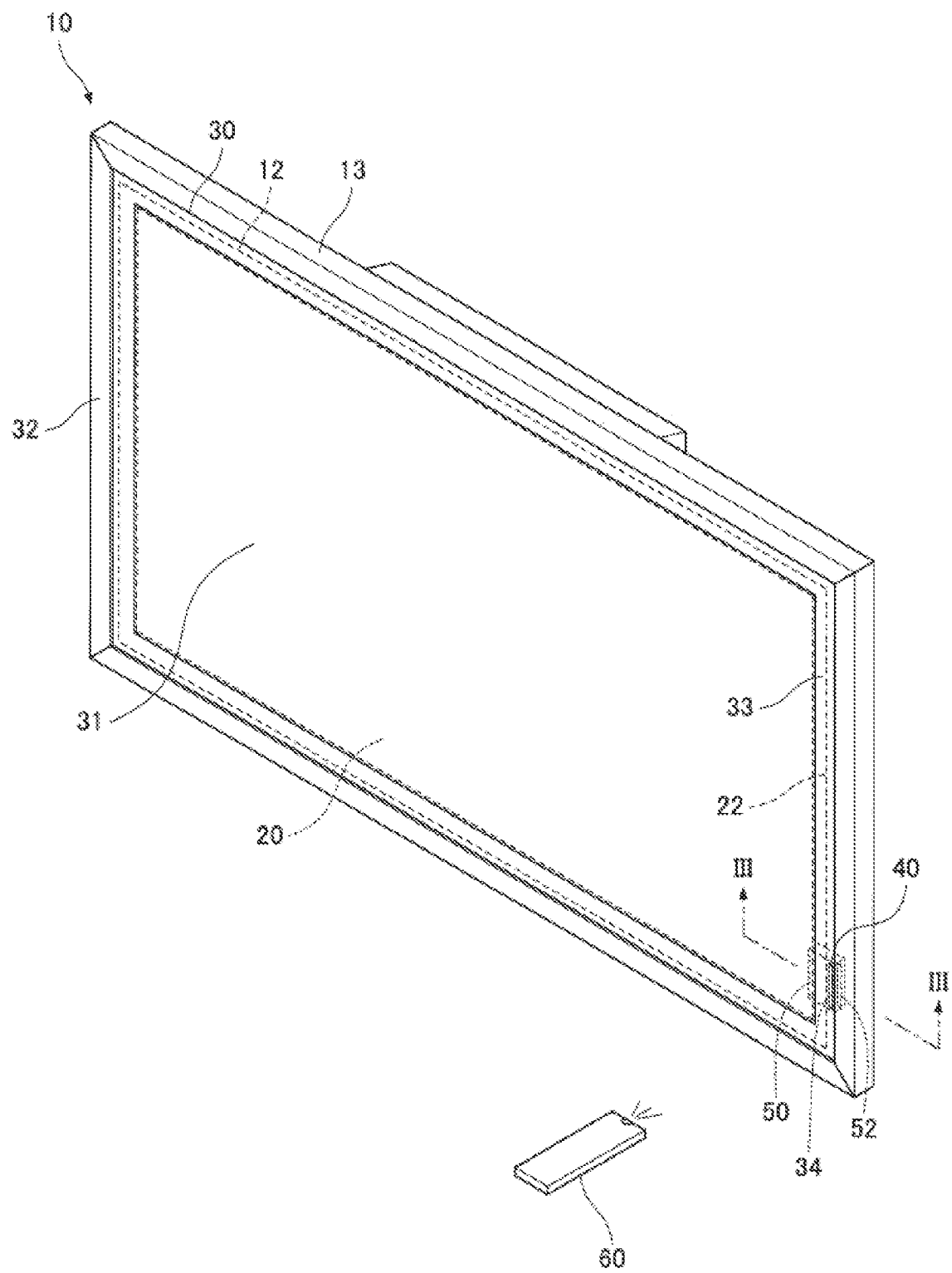
FIG. 1 is a perspective view of an example of a touch input display system according to an embodiment.

FIG. 1 is a perspective view of an example of a touch input display system 10 according to an embodiment. The touch input display system 10 includes a display device 12 and a touch input device 13 attached to the display device 12. Examples of the display device 12 include a ready-made product that functions as a stand-alone device, such as a liquid crystal display device. Examples of the touch input device 13 include an external touch input device that is optionally attached to the ready-made display device 12, such as a touch panel.

The display device 12 in the touch input display system 10 of FIG. 1 includes a display 20, a frame 22, and a light-receiving device 50. The display 20 displays various types of information including images to the user. The display 20 is, for example, a liquid crystal screen, such as a liquid crystal display device. The frame 22 encloses the display 20.

Although not visible from a front side of the touch input display system 10, the light-receiving device 50, shown in a dashed line in FIG. 1, is located on a far side relative to the frame 22. The light-receiving device 50 includes a light receiver 52. The light receiver 52 receives infrared light emitted from an external operation device 60, such as a remote controller. The light receiver 52 includes an infrared light sensor with a light-receiving element (e.g., a photodiode) that responds to infrared light. The light-receiving device 50 processes infrared light received by the light receiver 52 so as to convert the infrared light into an electrical signal.

The touch input device 13 shown in FIG. 1 has a touch inputter 30, a frame body 32, and an infrared light guide 40. The touch inputter 30 accepts a touch input performed by a user, and is, for example, a touch panel. The frame body 32 encloses the touch inputter 30. The frame body 32 has the infrared light guide 40. The infrared light guide 40 guides infrared light emitted from the external operation device 60 to the light receiver 52 of the light-receiving device 50 while the touch input device 13 is attached to the display device 12. As shown in FIG. 1, the touch input device 13 is attached to the display 20 such that the frame body 32 overlaps with a front side of the frame 22.

The touch input device 13 includes a first region 31, a second region 33, and a third region 34. The first region 31 covers the display 20. The first region 31 is an inner region of the touch inputter 30 that overlaps with the front side of the display 20. The second region 33 is positioned outside the first region 31. The second region 33 overlaps with the front side of the frame 22 and is a peripheral region of the first region 31. The second region 33 has lower transmittance than the first region 31. Specifically, the first region 31 is constituted by a transparent touch panel, and the second region 33 has a black mask as a light-shielding portion, for example. The third region 34 is included in the second region 33. The third region 34 covers the infrared light guide 40. The third region 34 reflects or diffuses infrared light toward an inner side of the infrared light guide 40. Furthermore, the infrared light guide 40 reflects or diffuses infrared light and guides the infrared light to the light receiver 52.

The user of the touch input display system 10 can make an input to the touch input display system 10 by performing a touch operation in a predetermined position of the touch inputter 30 based on screen display of the display 20. The user can perform an input to the touch input display system 10 also by causing the external operation device 60 to emit infrared light to the light-receiving device 50.

Figure 2:
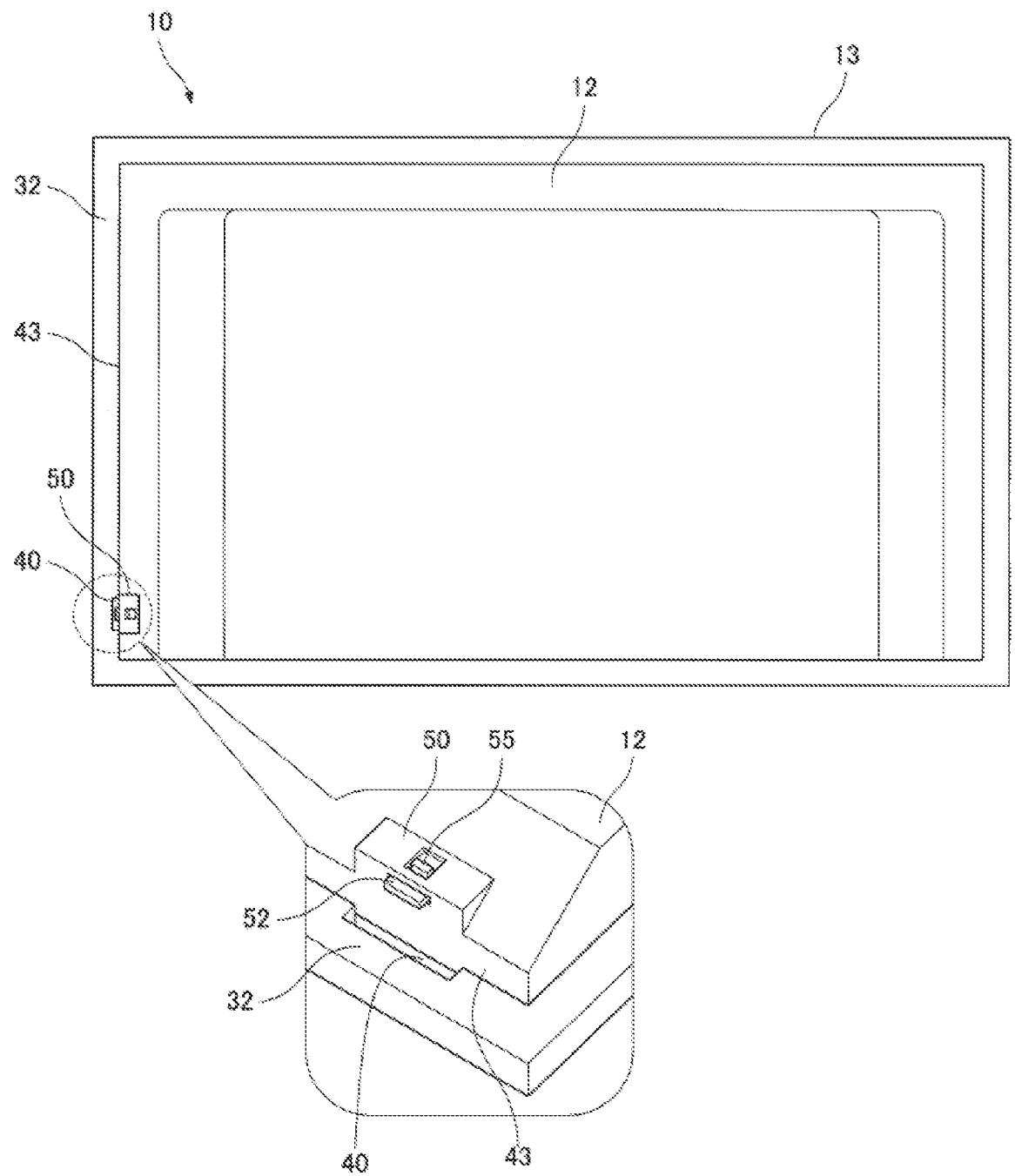
FIG. 2 includes a rear view and a partially enlarged view of the touch input display system of FIG. 1.

Next, the touch input display system 10 will be described in more detail with reference to FIG. 2. FIG. 2 includes a rear view and a partially enlarged view of the touch input display system 10 of FIG. 1. As shown in FIG. 2, an outer periphery of the display device 12 in the rear view corresponds to an outer peripheral surface 43 of the frame 22. The light-receiving device 50 is disposed on a portion of the outer peripheral surface 43 of the frame 22. As shown in the partially enlarged view (a perspective view) inside a balloon in FIG. 2, the light-receiving device 50 of FIG. 2 includes the light receiver 52 and a pull-out tab 55. In FIG. 2, the light receiver 52 protrudes from a portion of the outer peripheral surface 43 of the frame 22. Here, the light receiver 52 may be designed to be retractable relative to the light-receiving device 50. It is preferable, for example, that the pull-out tab 55 of the light-receiving device 50 is mechanically connected to the light receiver 52 and moves together with the light receiver 52. In FIG. 2, the light receiver 52 may be switched between a state in which the light receiver 52 is accommodated in the light-receiving device 50 and a state in which the light receiver 52 protrudes from the light-receiving device 50 by sliding the pull-out tab 55.

Figure 3:
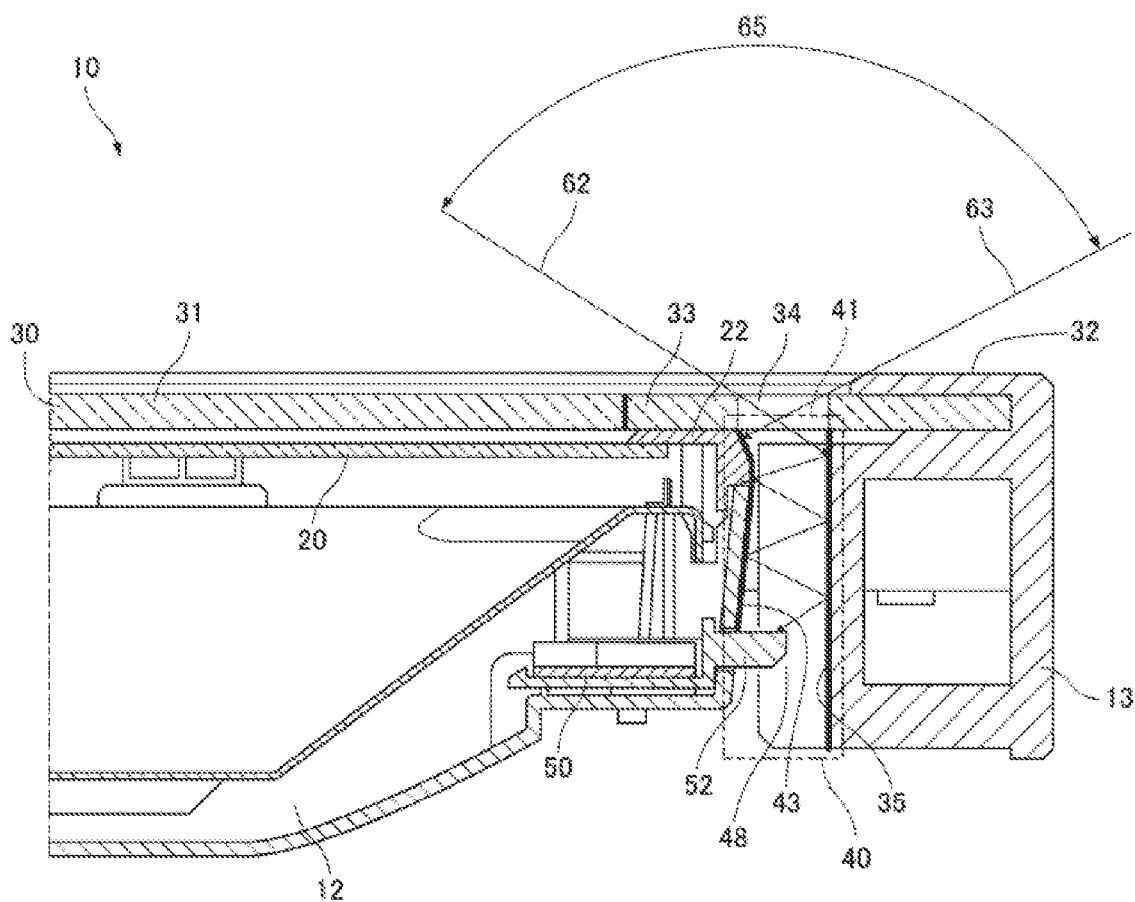
FIG. 3 is a cross-sectional view taken along a line III to III of FIG. 1.

Next, the touch input device 13 will be described in more detail with reference to FIG. 3. FIG. 3 is a cross-sectional view taken along a line III to III of FIG. 1. As shown in FIG. 3, the frame body 32 of the touch input device 13 supports the touch inputter 30 extending in a lateral direction in FIG. 3. Since the frame body 32 overlaps with the front side of the frame 22, the touch inputter 30 overlaps with the front side of the display 20 of the display device 12 (an upper side in FIG. 3).

In the second region 33 positioned on the front side of the frame 22 enclosing the display 20, an inlet 41 for infrared light to be incident on the infrared light guide 40 is positioned in a portion of a region outside the frame 22. As shown by a virtual line in FIG. 3, the infrared light guide 40 is disposed on the frame body 32 at a gap between the frame 22 and the frame body 32. The inlet 41 is covered by the third region 34.

The third region 34 reflects or diffuses infrared light toward an inner side of the infrared light guide 40. Therefore, as shown in FIG. 3, infrared light beams 62 and 63 that are incident on the inlet 41 through the third region 34 are guided into an interior of the infrared light guide 40. The infrared light guide 40 includes reflective members that reflect infrared light. Specifically, in the infrared light guide 40, the reflective members (e.g., a mirror or a metallic tape) that reflect infrared light are disposed on an inner surface 35 of the frame body 32 and the outer peripheral surface 43 of the frame 22. The infrared light beams 62 and 63 are repeatedly reflected by the reflective members and guided to the light receiver 52 protruding from the portion of the outer peripheral surface 43 of the frame 22.

Since the infrared light is guided to the light receiver 52 by the reflective members of the infrared light guide 40, even when the infrared light beams 62 and 63 are emitted from a direction at a large angle relative to the light receiver 52 as shown in FIG. 3, the light receiver 52 can receive the light. Specifically, a light-receiving range 65 shown in FIG. 3 attains high light-receiving performance since the touch input display system 10 of this embodiment is capable of receiving light in a large range. In particular, the touch input display system 10 of this embodiment is capable of receiving infrared light emitted from a center portion of the display 20, such as the infrared light beam 62 shown in FIG. 3. Therefore, the touch input display system 10 of this embodiment has considerably improved light-receiving performance when compared with a case where the display device 12 is used alone or a case where a touch input device that does not include the infrared light guide 40 is attached to the display device 12.

The infrared light guide 40 in FIG. 3 has a light guideway extending in a direction that intersects with a surface of the touch input device 13 (a surface of the touch inputter 30) (a vertical direction in FIG. 3). In FIG. 3, the light guideway is a path sandwiched between the inner surface 35 of the frame body 32 and the outer peripheral surface 43 of the frame 22. The light receiver 52 is positioned on the light guideway and is capable of receiving infrared light passing through the light guideway. The path of the infrared light guide 40 is not limited to that shown in FIG. 3, and the infrared light guide 40 may be any path as long as light incident on the inlet 41 is guided to the light receiver 52. For example, the infrared light guide 40 may be bent. Even when the infrared light guide 40 is bent, light incident on the inlet 41 is guided by the reflective members to the light receiver 52. Even in a case where the infrared light guide 40 is a complicated path and does not include the reflective members, when a transparent light guide member including a transparent member is arranged to guide light along the path, for example, the infrared light guide 40 can guide infrared light to the light receiver 52. Examples of the transparent light guide member include a member that guides light incident inside the transparent member using total reflection at an interface, such as a light-guiding plate or an optical fiber.

An outlet 48 is provided on an opposite side of the inlet 41 of the infrared light guide 40. An area of the inlet 41 is preferably larger than that of the outlet 48. The infrared light guide 40 becomes smaller from the inlet 41 to the outlet 48, and therefore, the light receiver 52 located near the outlet 48 can easily receive infrared light that is incident from the inlet 41. In particular, when the area of the inlet 41 is larger than an area of the light receiver 52 which directly receives infrared light, the light receiver 52 can receive infrared light coming from a wider range.

Figure 4:
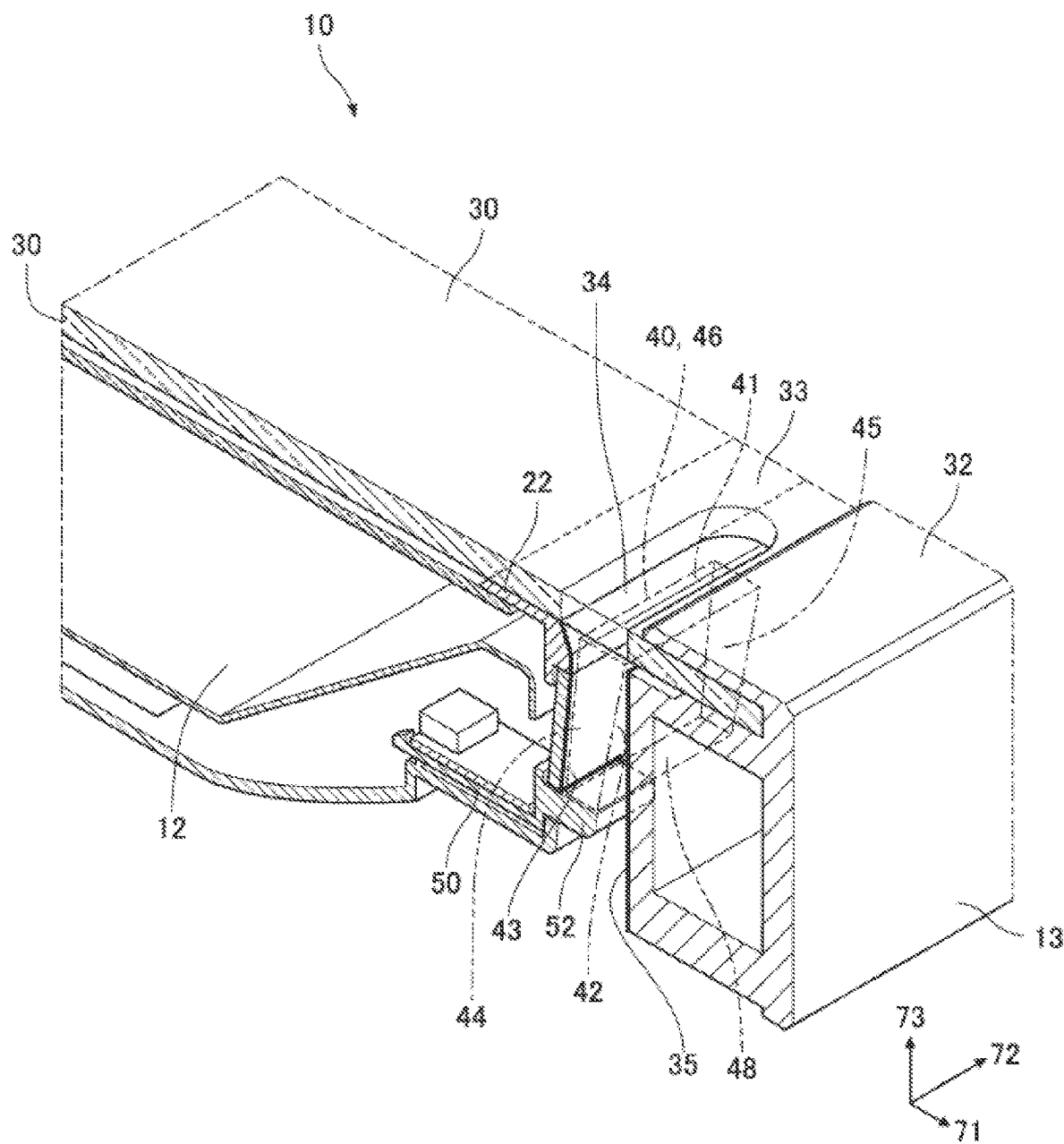
FIG. 4 is a perspective view of a cross section taken along the line III to III of FIG. 1.

In FIG. 4, the example in which the area of the inlet 41 of the infrared light guide 40 is larger than that of the outlet 48 is illustrated. FIG. 4 is a perspective view of a cross section taken along the line III to III of FIG. 1. The infrared light guide 40 in FIG. 4 has a cylinder 46 indicated by a virtual line. The light guideway of the infrared light guide 40 is positioned inside the cylinder 46. The cylinder 46 is a cylindrical member made of a reflective material (such as a mirror or a metal tape) that reflects infrared light, for example, and has a shape of a square cylinder in FIG. 4. The presence of the cylinder 46 limits a light path of infrared light incident on the infrared light guide 40 to a range within the cylinder 46, and accordingly, leakage of the infrared light is suppressed. Therefore, loss of the infrared light before being guided to the light receiver 52 is reduced, and light-receiving performance is improved. Note that the cylinder 46 may be of any shape that can guide infrared light to the light receiver 52, and may be a circular cylindrical shape, for example.

The cylinder 46 has open sides in a front-back direction 73 (a direction intersecting with the surface of the touch input device 13) in which refractive members are not arranged. A surface on a front side (an upper side in FIG. 4) of the cylinder 46 corresponds to the inlet 41 of the infrared light guide 40, which is open to the third region 34. A surface on a rear side (a lower side in FIG. 4) of the cylinder 46 corresponds to the outlet 48 of the infrared light guide 40, which is open to the light receiver 52. As illustrated in FIG. 4, the area of the inlet 41 of the infrared light guide 40 is larger than that of the outlet 48.

The cylinder 46 in FIG. 4 includes a first side 42, a second side 44, and a third side 45, and is surrounded by the outer peripheral surface 43 of the frame 22, the first side 42, the second side 44, and the third side 45. When the outer peripheral surface 43 of the frame 22, the first side 42, the second side 44, and the third side 45 have respective reflective members, infrared light incident on the inlet 41 is easily guided to the light receiver 52.

The first side 42 of the cylinder 46 faces a portion of the outer peripheral surface 43 of the frame 22 in a first direction 71 extending from the frame 22 to the frame body 32.

The second side 44 of the cylinder 46 extends in the first direction 71. The third side 45 of the infrared light guide 40 extends in the first direction 71 and faces the second side 44 in a second direction 72 which intersects with the first direction 71.

Furthermore, the light receiver 52 protrudes from a portion of the outer peripheral surface 43 of the frame 22 that faces the first side 42. In FIG. 4, infrared light incident on the inlet 41 is guided to the light receiver 52 by the infrared light guide 40 surrounded by the outer peripheral surface 43 of the frame 22, the first side 42, the second side 44, and the third side 45. Accordingly, the majority of the infrared light incident on the inlet 41 is received by the light receiver 52.

As mentioned above, in the touch inputter 30, the second region 33 that overlaps on the front side of the frame 22 in a position outside the first region 31 covering the display 20 has lower transmittance than the first region 31. Furthermore, the inlet 41 of the infrared light guide 40 is covered by the third region 34.

Moreover, the third region 34 is subjected to frosted glass processing, for example, so as to diffuse infrared light. Then, infrared light that is incident on the inlet 41 through the third region 34 is diffused into the infrared light guide 40 and guided to the light receiver 52. Since the third region 34 diffuses infrared light, infrared light that is incident on the third region 34 at any angle can be guided by the infrared light guide 40.

According to the touch input display system 10 of this embodiment, the frame body 32 of the touch input device 13 is attached such that the frame body 32 overlaps on the front side of the frame 22 of the display device 12. Then, the infrared light guide 40 disposed on the frame body 32 of the touch input device 13 guides infrared light emitted from the external operation device 60, such as a remote controller, to the light receiver 52. According to the touch input display system 10, even when the frame body 32 is disposed on the front side of the frame 22 on which the light receiver 52 is disposed, infrared light emitted from the external operation device 60 is guided to the light receiver 52 by the infrared light guide 40, and therefore, the light-receiving performance of the display device 12 is not degraded.

Furthermore, since the infrared light guide 40 has the light guideway extending in the direction that intersects with the surface of the touch input device 13 and the cylinder 46 in which the light guideway is located, loss of infrared light to be guided to the light receiver 52 is reduced (the majority of the infrared light is received), and accordingly, light-receiving performance is improved.

Furthermore, since the area of the inlet 41 of the infrared light guide 40 is larger than that of the outlet 48, the light receiver 52 can receive infrared light coming from a wider range. Specifically, the infrared light-receiving range of the display device 12 becomes wider and the light-receiving performance is improved.

In addition, since the infrared light guide 40 includes the reflective members that reflect infrared light, even infrared light that is incident from a direction at a large angle relative to the light receiver 52 can be received by the light receiver 52. Specifically, the infrared light-receiving range of the display device 12 becomes wider and the light-receiving performance is improved.

In addition, since the infrared light guide 40 includes the first side 42, the second side 44, and the third side 45, the incident infrared light can be surrounded by the plurality of sides to guide the incident light to the light receiver 52.

Therefore, loss of the infrared light to be guided to the light receiver 52 is reduced, and the light-receiving performance is improved.

Furthermore, since the third region 34 covering the infrared light guide 40 diffuses infrared light, infrared light that is incident on the third region 34 at any angle can be guided by the infrared light guide 40. Specifically, the infrared light-receiving range of the display device 12 becomes wider and the light-receiving performance is improved.

Figure 5:
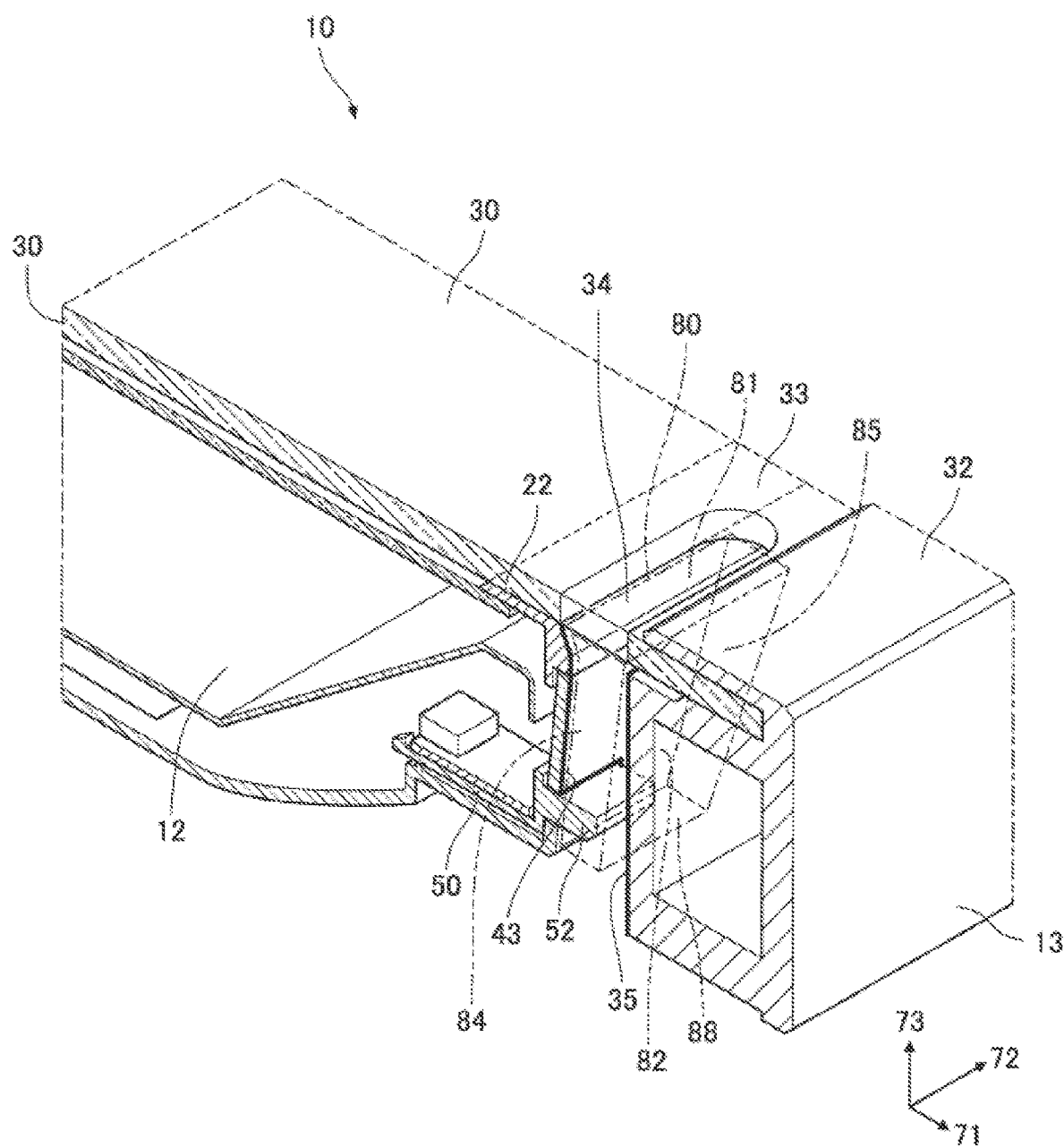
FIG. 5 is a perspective view of a cross section of another example of the touch input display system according to the embodiment.

FIG. 5 is a perspective view of a cross section of another example of the touch input display system 10 according to the embodiment. FIG. 5 shows the same range as in FIG. 4. In FIG. 5, the cylinder 46 shown in FIG. 4 does not exist, and an infrared light guide 80 includes a first side 82, a second side 84, and a third side 85. In FIG. 5, components other than the infrared light guide 80 are denoted by the same symbols as in FIG. 4, and the same symbols as in FIG. 4 indicate the same components as in FIG. 4.

A front side (an upper side of FIG. 5) of the infrared light guide 80 in the front-back direction 73 corresponds to an inlet 81 of the infrared light guide 80. The inlet 81 is open to the third region 34 of the display 20. The rear side (a lower side of FIG. 5) of the infrared light guide 80 corresponds to an outlet 88 of the infrared light guide 80. The outlet 88 is an open side and has a larger area than the light receiver 52. An area of the inlet 81 is larger than that of the outlet 88.

In FIG. 5, the first side 82 of the infrared light guide 80 faces a portion of the outer peripheral surface 43 of the frame 22 in the first direction 71 extending from the frame 22 to the frame body 32. Furthermore, the second side 84 of the infrared light guide 80 extends in the first direction 71. The third side 85 of the infrared light guide 80 extends in the first direction 71 and faces the second side 84 in the second direction 72 which intersects with the first direction 71.

Furthermore, the light receiver 52 of the light-receiving device 50 protrudes from a portion of the outer peripheral surface 43 of the frame 22 that faces the first side 82. In the embodiment described with reference to FIG. 5, the light receiver 52 is positioned inside the infrared light guide 80 surrounded by the outer peripheral surface 43 of the frame 22, the first side 82, the second side 84, and the third side 85. The infrared light that is incident on the inlet 81 through the third region 34 is guided to the light receiver 52 near the outlet 88 without being leaked outside the infrared light guide 80. Accordingly, the majority of the infrared light incident on the inlet 81 is received by the light receiver 52.

In particular, when the outer peripheral surface 43 of the frame 22, the first side 82, the second side 84, and the third side 85 that surround the infrared light guide 80 have respective reflective members, infrared light incident on the inlet 81 at any angle is easily guided to the light receiver 52. Specifically, even infrared light at a large angle relative to the light receiver 52 is guided to the light receiver 52. In particular, infrared light emitted from a direction of a center portion of the display 20 is guided to the light receiver 52. Accordingly, also in the other example of the embodiment shown in FIG. 5, the light-receiving performance of the display device 12 included in the touch input display system 10 is considerably improved.

The embodiment of the present disclosure has been described above with reference to the drawings. However, the present disclosure is not limited to the embodiment described above, and can be implemented in various aspects without departing from the scope of the present disclosure. In the drawings, the components are primarily illustrated in a schematic manner for easy understanding, and thicknesses, lengths, numbers, intervals, and the like of the illustrated components are different from the actual ones for convenience of the drawings. Furthermore, materials, shapes, dimensions, and the like of the components illustrated in the above embodiment are merely examples and are not particularly limited and may be variously modified without substantially departing from the configuration of the present disclosure.

The invention claimed is:

1. A touch input display system including a display device and a touch input device attachable to the display device, wherein the display device includes a display that displays images, a frame that encloses the display, and a light receiver that is disposed on the frame to receive infrared light emitted from an external operation device, the touch input device includes a touch inputter, a frame body that encloses the touch inputter, and an infrared light guide that is disposed on the frame body to guide the infrared light emitted from the external operation device, when the touch input device is attached to the display, the frame body partially overlaps a front side of the frame, the infrared light guide includes a first side, a second side, and a third side, the first side faces a portion of an outer peripheral surface of the frame in a first direction extending from the frame to the frame body, the second side extends in the first direction, the third side extends in the first direction and faces the second side in a second direction that intersects with the first direction, and the infrared light guide guides the infrared light emitted from the external operation device to the light receiver by a light path surrounded by the first side, the second side, the third side, and a portion of the outer peripheral surface of the frame while the touch input device is attached to the display device.

2. The touch input display system according to claim 1, wherein an area of an inlet for the infrared light in the infrared light guide is larger than an area of an outlet for the infrared light in the infrared light guide.

3. The touch input display system according to claim 1, wherein the infrared light guide includes a reflective member that reflects the infrared light.

4. The touch input display system according to claim 1, wherein the light receiver protrudes from a portion of the outer peripheral surface of the frame.

5. The touch input display system according to claim 1, wherein the touch input device further includes a first region that covers the display, a second region that is positioned outside the first region and that has transmittance lower than transmittance of the first region, and a third region that is positioned in the second region and that covers the infrared light guide, and the third region diffuses the infrared light.

6. The touch input display system according to claim 1, wherein reflective members are provided respectively on the first side, the second side, the third side and the outer peripheral surface of the frame that surrounds the light path.

* * * * *